United States Patent
McMillan et al.

(10) Patent No.: US 8,911,322 B2
(45) Date of Patent: Dec. 16, 2014

(54) LOW STROKE LENGTH LOCKING DIFFERENTIAL WITH HIGH LOCKING ENGAGEMENT LENGTH

(71) Applicant: Eaton Corporation, Cleveland, OH (US)

(72) Inventors: Patrick John McMillan, Battle Creek, MI (US); Daniel Philip Fisher, Coldwater, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 13/980,100

(22) PCT Filed: Mar. 15, 2013

(86) PCT No.: PCT/US2013/031989
§ 371 (c)(1),
(2), (4) Date: Jul. 17, 2013

(87) PCT Pub. No.: WO2014/028054
PCT Pub. Date: Feb. 20, 2014

(65) Prior Publication Data
US 2014/0235397 A1  Aug. 21, 2014

Related U.S. Application Data

(60) Provisional application No. 61/683,298, filed on Aug. 15, 2012.

(51) Int. Cl.
*F16H 48/20* (2012.01)
*F16H 48/24* (2006.01)

(52) U.S. Cl.
CPC ...................... *F16H 48/24* (2013.01)
USPC ....................................... 475/231

(58) Field of Classification Search
USPC .......................................... 475/231, 236, 240
See application file for complete search history.

(56) References Cited

U.S. PATENT DOCUMENTS

| 2,778,246 A | 1/1957 | Thornton |
| 4,920,679 A | 5/1990 | Sarles et al. |
| 5,394,967 A | 3/1995 | Bigley |

(Continued)

FOREIGN PATENT DOCUMENTS

| JP | 370690 | 7/1956 |
| JP | 06241249 | 8/1994 |

(Continued)

*Primary Examiner* — Edwin A Young
(74) *Attorney, Agent, or Firm* — Mei & Mark LLP (57) ABSTRACT

A differential, comprising a gear case, a side gear, an actuator, and a collar. The gear case comprising a central axis and recesses. The side gear configured to rotate around the central axis. The side gear comprising radially outward-extending locking members comprising side gear segments separated by plural grooves. The actuator surrounding the central axis. The collar configured to translate bi-directionally along the central axis. The collar comprising ears and radially inward-extending locking members comprising collar segments separated by plural grooves. The actuator is configured to move the collar relative to the side gear to move the ears axially in the recesses. When the actuator moves the collar to a locked position, the collar segments are configured to engage the side gear segments. When the actuator moves the collar to an unlocked position, the side gear segments are configured to pass through the grooves of the radially inward-extending locking members.

16 Claims, 6 Drawing Sheets

(56) References Cited

U.S. PATENT DOCUMENTS

| | | |
|---|---|---|
| 6,406,400 B1 | 6/2002 | Shih |
| 6,551,209 B2 | 4/2003 | Cheadle et al. |
| 7,264,569 B2 | 9/2007 | Fox |
| 8,087,194 B1 | 1/2012 | Vuksanovich |
| 2001/0041637 A1 | 11/2001 | Leeper |
| 2004/0198546 A1 | 10/2004 | Okazaki |
| 2006/0160650 A1 | 7/2006 | Fox |
| 2006/0270510 A1 | 11/2006 | Pistagnesi et al. |
| 2007/0142157 A1* | 6/2007 | Nofzinger et al. ............ 475/231 |
| 2007/0179008 A1* | 8/2007 | Fusegi et al. ................. 475/231 |
| 2008/0085804 A1* | 4/2008 | Kwoka ......................... 475/231 |
| 2008/0146353 A1* | 6/2008 | Boffelli et al. ................. 464/29 |
| 2008/0182702 A1 | 7/2008 | Donofrio et al. |
| 2009/0247350 A1 | 10/2009 | Donofrio et al. |
| 2010/0041506 A1 | 2/2010 | Cooper et al. |
| 2010/0298083 A1 | 11/2010 | Dayton |
| 2010/0311533 A1 | 12/2010 | Balenda, II et al. |
| 2011/0009223 A1 | 1/2011 | Donofrio et al. |
| 2011/0165989 A1 | 7/2011 | Balenda, II et al. |

FOREIGN PATENT DOCUMENTS

| | | |
|---|---|---|
| JP | 2008527274 | 7/2008 |
| WO | 2006075246 A1 | 7/2006 |
| WO | WO 2010/141367 A2 | 12/2010 |

* cited by examiner

LOW STROKE LENGTH LOCKING DIFFERENTIAL WITH HIGH LOCKING ENGAGEMENT LENGTH

PRIORITY

This application claims the benefit of priority of U.S. provisional patent application 61/683,298, filed Aug. 15, 2012, incorporated herein by reference in its entirety.

TECHNICAL FIELD

The present disclosure relates generally to locking differentials. More specifically, the disclosure relates to locking differentials of the collar style having a low stroke length yet high engagement length.

BACKGROUND

Traction modifying locking differentials typically include a gear case defining a gear chamber, and disposed therein, a differential gear set including at least one input pinion gear and a pair of output side gears. Typically, such a "locking differential" includes a locking mechanism to selectively prevent rotation of one of the side gears relative to the gear case, the engagement of the locking mechanism being initiated by an actuator.

The torque capacity of the locking mechanism in a locking differential is a function of the axial travel of the locking mechanism, as it moves between the locked and unlocked conditions. The travel of the locking mechanism is limited by the axial travel of an "inner ramp plate" disposed adjacent the differential case. By way of example only, in a commercial embodiment of a locking differential made in accordance with the teachings of U.S. Pat. No. 6,551,209, the locking members have an axial travel of about 4 mm and an effective "locking engagement" of about 3 mm. In another example within the teachings of U.S. Pat. No. 7,264,569, the differential has a locking member with a travel of about 8 mm to 12 mm and an engagement length of about 8 mm.

SUMMARY

The present disclosure proposes a locking differential with a low stroke length, low travel, and a high locking engagement length.

A differential comprises a gear case comprising a central axis and recesses. A side gear is configured to rotate around the central axis. The side gear comprises radially outward-extending locking members. The radially outward-extending locking members further comprise side gear segments separated by plural grooves. An actuator surrounds the central axis. A collar is configured to translate bi-directionally along the central axis. The collar comprises ears and radially inward-extending locking members. The radially inward-extending locking members further comprise collar segments separated by plural grooves. The actuator is configured to move the collar relative to the side gear such that the ears move axially in the recesses. When the actuator moves the collar to a locked position, the collar segments are configured to engage the side gear segments. When the actuator moves the collar to an unlocked position, the side gear segments are configured to pass through the grooves of the radially inward-extending locking members.

DETAILED DESCRIPTION

Reference will now be made in detail to the examples illustrated in the accompanying drawings. Wherever possible, the same reference numbers will be used throughout the drawings to refer to the same or like parts.

Figure 1:
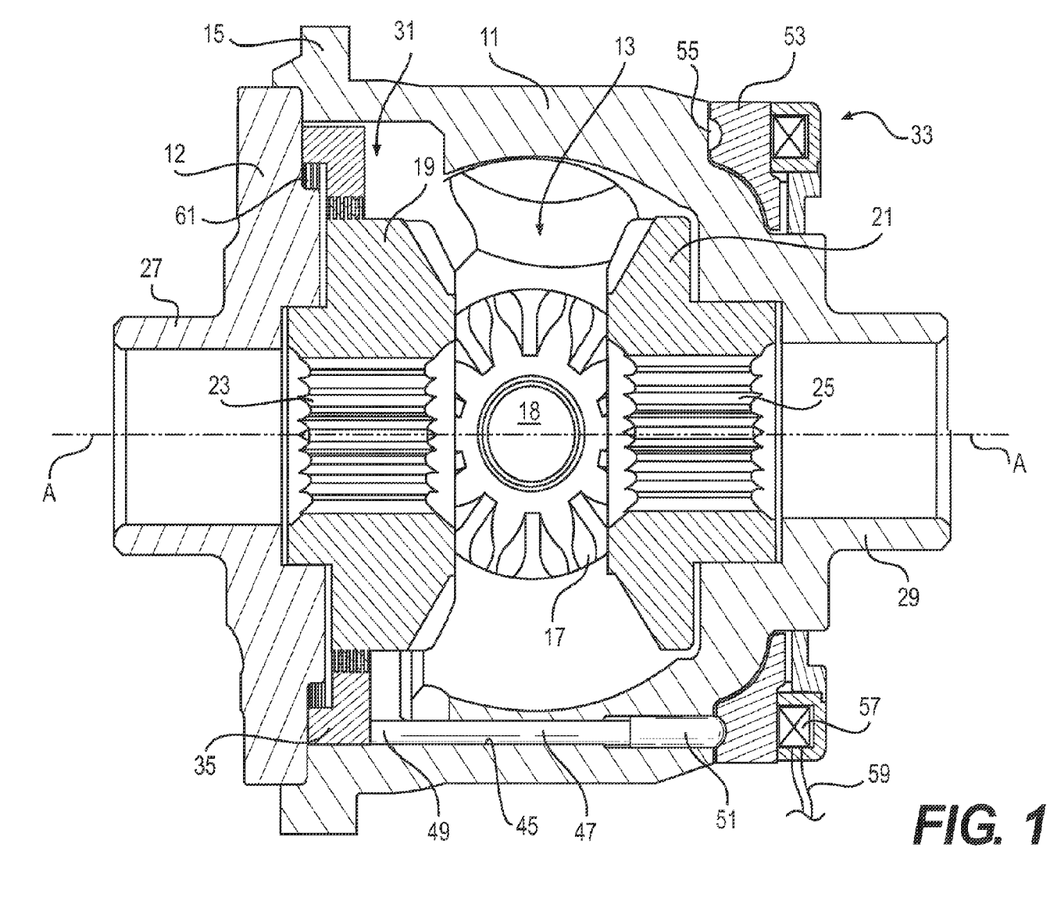
FIG. 1 is an axial cross-section of a locking differential in its un-actuated, unlocked condition.

FIG. 1 is an axial cross-section of a locking differential. The locking differential shown in FIG. 1 includes a gear case 11 and an end cap 12, which may be attached to the gear case 11 by any suitable means, such as a plurality of bolts (not shown). The gear case 11 and the end cap 12 cooperate to define a gear chamber, generally designated 13. The gear case 11 defines annular hub portions 27 and 29, on which may be mounted bearing sets for providing rotational support for the rotating differential device relative to an outer differential housing or "carrier" (not shown).

Torque input to the locking differential is typically by means of an input ring gear which may be attached to a flange 15. Disposed within the gear chamber 13 is a differential gear set including a pair of input pinion gears 17. As is typical, the input pinion gears 17 are mounted rotatably about a pinion shaft 18, the pinion shaft 18 being secured relative to the gear case 11 by any suitable means. The pinion gears 17 comprise the input gears of the differential gear set, and are in meshing engagement with a pair of side gears 19 and 21. The side gears 19 and 21 define sets of internal, straight splines 23 and 25, which are configured to be in splined engagement with mating external splines on a pair of axle shafts (not shown).

During normal, straight ahead operation of the vehicle, no differentiation occurs between the left and right axle shafts, or between the left and right side gears 19 and 21. Therefore, the pinion gears 17 do not rotate relative to the pinion shaft 18. The pinion shaft 18 rotates as an outer ring gear, surrounding the case, is rotated. As a result, the gear case 11, the pinion gears 17, and the side gears 19 and 21 all rotate about an axis of rotation A, as if comprising a solid unit. When the vehicle turns, the side gears 19 and 21 can rotate at different rates because they can rotate against the pinion gears 17. If a locked condition is desired, the side gears 19 and 21 can be locked from differential rotation by preventing at least one of the side gears 19 and 21 from rotating at a rate different from the case rotation rate. In the illustrated example, the locked mode entails locking one side gear 19 to rotate with the case. Because this in effect prevents the pinion gears 17 from rotating about the pinion shaft 18, the other side gear 21 cannot rotate at a rate that is different from the first side gear, and the other side gear 21 rotates at the same rate as the case.

Referring now primarily to FIG. 1, the locking differential includes a rotation prevention mechanism, generally designated 31, which is disposed entirely within the gear case 11 and is operably associated with the side gear 19. The locking differential also includes an actuation mechanism, generally designated 33, which is external to the gear case 11 in this example.

Figure 2:
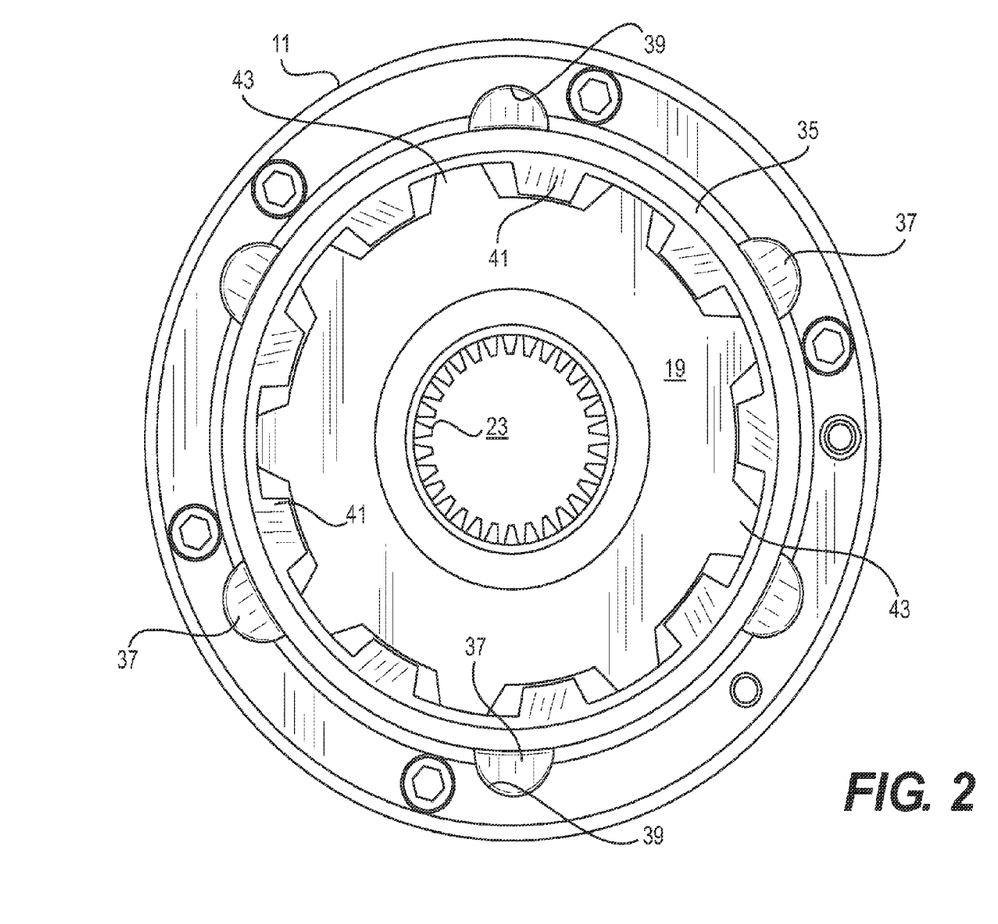
FIG. 2 is a view taken from the left in FIG. 1 with the end cap removed.
Figure 3:
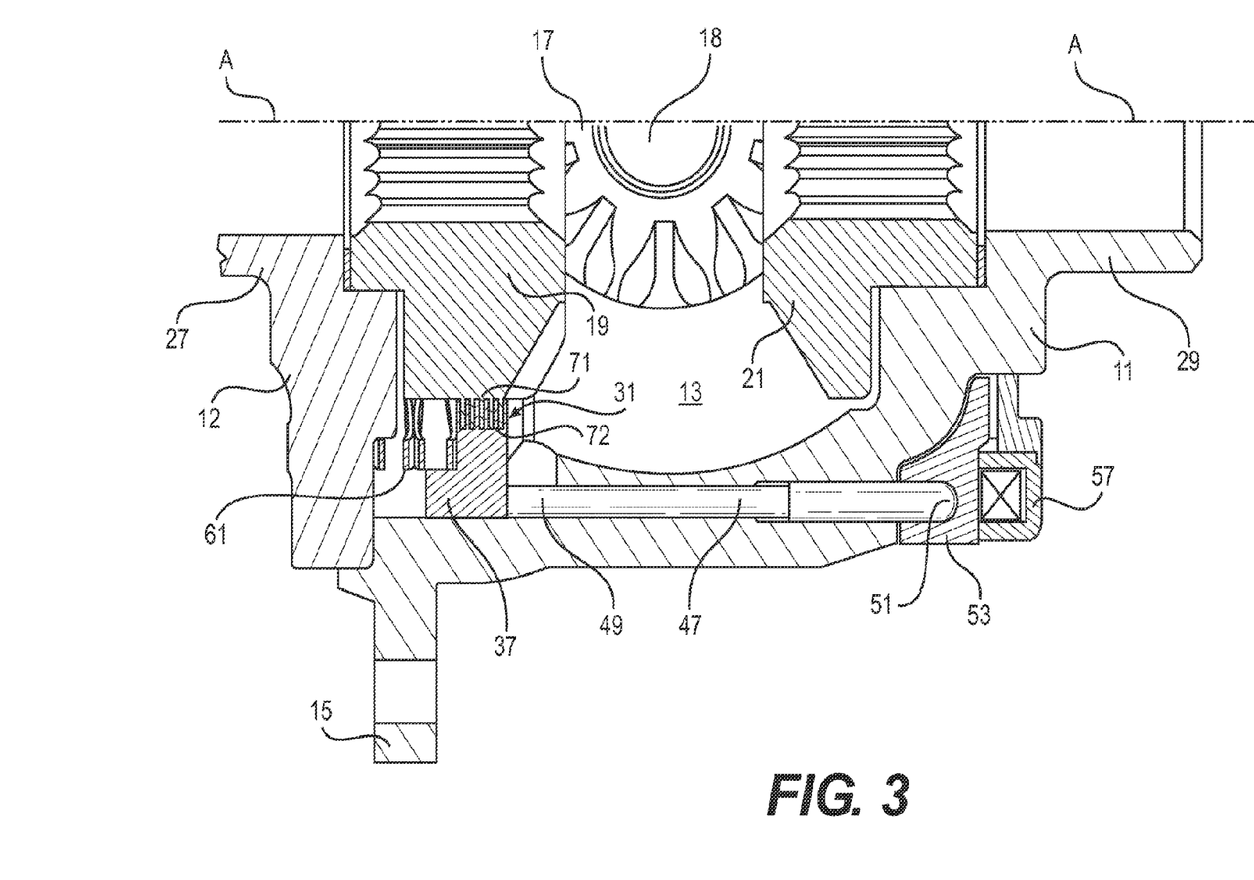
FIG. 3 is an alternative view of a locking differential in an un-actuated, unlocked condition.
Figure 4:
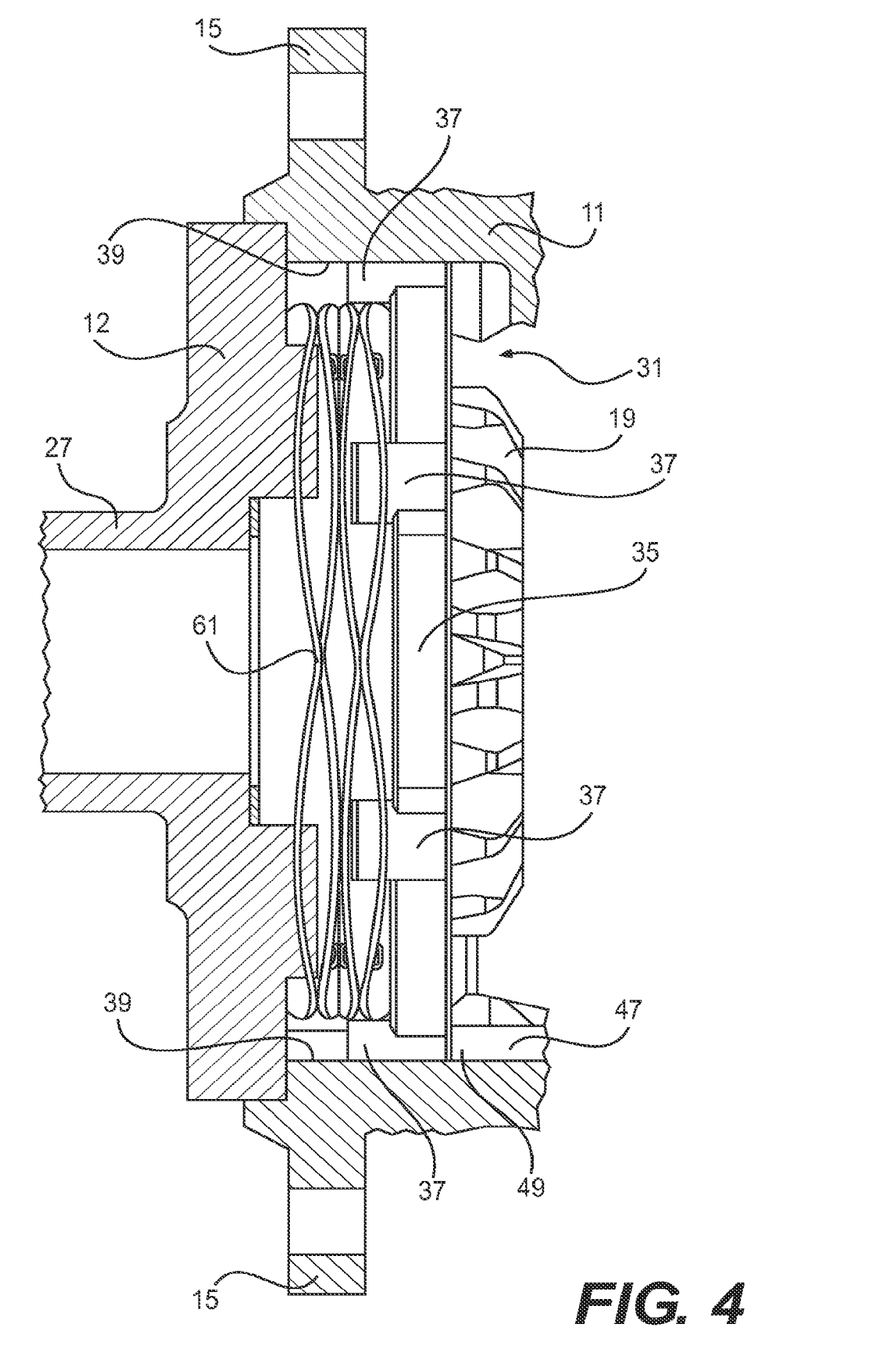
FIG. 4 is a view of a biasing spring arrangement with the collar in a locked condition.

The rotation prevention mechanism 31 comprises a generally annular collar 35 which includes, about its outer periphery, a plurality of ears 37, shown in FIGS. 2 and 4. By way of example only, there are provided six ears 37. Each of the ears 37 is received within a mating, axially-extending recess 39 defined by the gear case 11, such that the collar 35 is prevented from rotating relative to the gear case 11, but is permitted to move axially between the locked position shown in FIGS. 6A and 6B and an unlocked position shown in FIGS. 3, 4 and 5.

Disposed about an inner periphery of the collar 35 are a plurality of collar lock members 41. Interdigitated therewith is a plurality of side gear lock members 43 disposed about an outer periphery of the side gear 19. By way of example only, there are nine of the collar lock members 41 and nine of the side gear lock members 43. Each collar lock member 41 has a circumferential gap between the next, and each side gear lock member 43 has a circumferential gap between the next. The gaps are sufficient to enable the collar lock members 41 to slide between the side gear lock members 43 in the direction out of the page in FIG. 2. That is, the collar 35 can slide along an axis in the direction out of the page of FIG. 2 so that the collar lock members 41 pass between the side gear lock members 43. The gaps can be adjusted to offer minimal clearance between lock members. Or, the gaps and number of lock members can be adjusted to have much greater clearances between lock members so as to have a minimum number of lock members, sufficient only to provide adequate force to engage the collar 35 with the side gear 19. However, the lock members must have enough clearance to facilitate movement of the collar member 35 from its unlocked position (shown in FIGS. 3, 4 and 5) to its locked position (as shown in FIGS. 6A and 6B).

Additionally, each lock member is segmented by having grooves therein. That is, collar lock member 41 comprises six segments 72 and side gear 19 comprises six segments 71. The segments and grooves allow the side gear 19 to rotate relative to the collar 35 even while the collar lock members 41 remain in proximity to the side gear lock members 43. The side gear segments 71 pass between the collar segments 72 when the differential is unlocked, yet the side gear segments 71 are in face-to-face engagement with the collar segments 72 when the differential is locked.

While the segments and grooves are illustrated as having squared edges, the segments and grooves may have rounded or beveled edges, or the segments may taper along their length or width with or without rounded or beveled edges. In addition, each collar segment 72 may be parallel to each other collar segment 72. The collar segments 72 may be polyhedrons, each with a central axis along its longest length, and the longest central axis of each collar segment 72 may be parallel to each other collar segment. This is likewise for the side gear segments 71, so that each side gear segment 71 may be parallel to each other side gear segment. Each side gear segment may be a polyhedron having a longest central axis, the longest central axis may be parallel to each other longest central axis of the other side gear segments. To enable the smooth rotation of the collar with respect to the side gear, each longest central axis of each side gear segment may be parallel to each longest central axis of each collar segment.

FIG. 1 represents the "unlocked" condition of the rotation prevention mechanism 31. FIGS. 6A and 6B represent the "locked" condition. In FIG. 2, the lock members 41 and 43 are centered relative to each other to show a position where the collar 35 can slide relative to the side gear 19. FIGS. 6A and 6B show that each collar lock member 41 can be in face-to-face engagement with an adjacent side gear lock member 43 to lock the differential. Each side gear segment 71 abuts a collar segment 72 in a manner that does not allow the rotation of the side gear 19 relative to the collar 35. That is, the collar 35 slides so that the grooves in the collar 35 no longer align with the side gear segments 71 and the grooves in the side gear 19 no longer align with the collar segments 72. A narrow face on the side gear segment 71 abuts a narrow face on a collar segment 72. While the rotation direction of the side gear 19 has been shown in FIGS. 6A and 6B to be clockwise with respect to FIG. 2, rotation in the opposite direction is also possible.

The combination of lock members and segments, as disclosed, greatly reduces the travel necessary to lock and unlock the differential. The collar must axially move only the width of a segment to engage or disengage the lock members. A clearance distance can be included to accommodate a clearance length between collar segments 72 and side gear segments 71.

Figure 5:
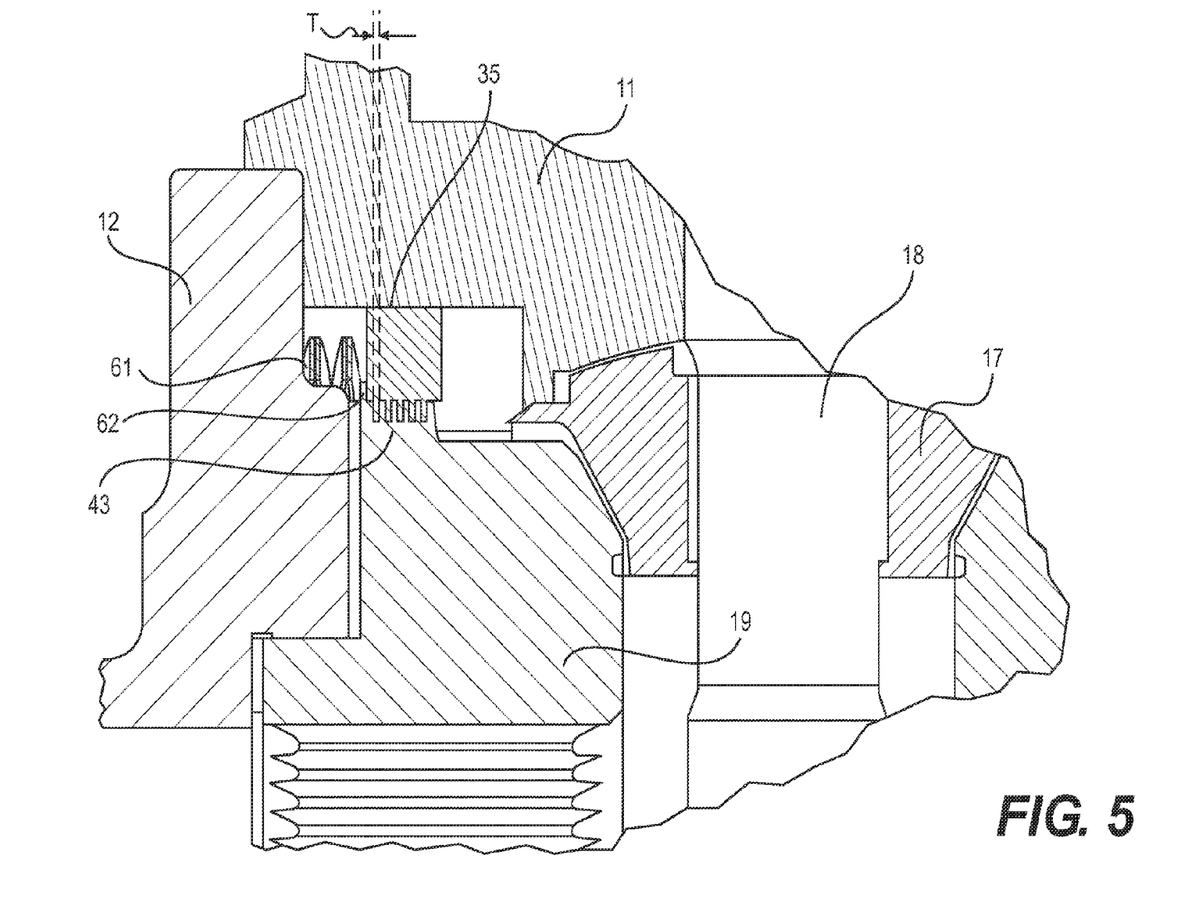
FIG. 5 is an axial cross-section showing the locking differential in its un-actuated, unlocked condition, and illustrating the "travel" of the locking mechanism.
Figure 6A:
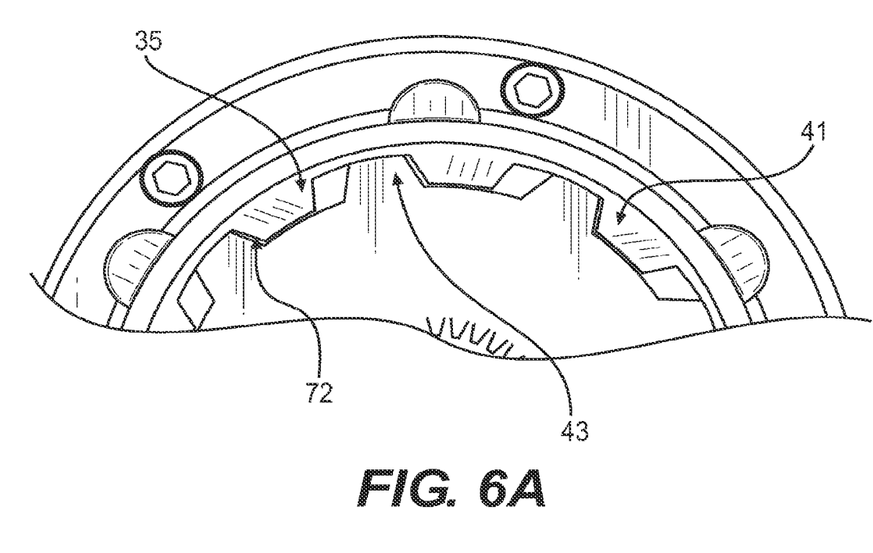
FIG. 6A is a view of the locked condition illustrating the alignment and face-to-face engagement of the segments.
Figure 6B:
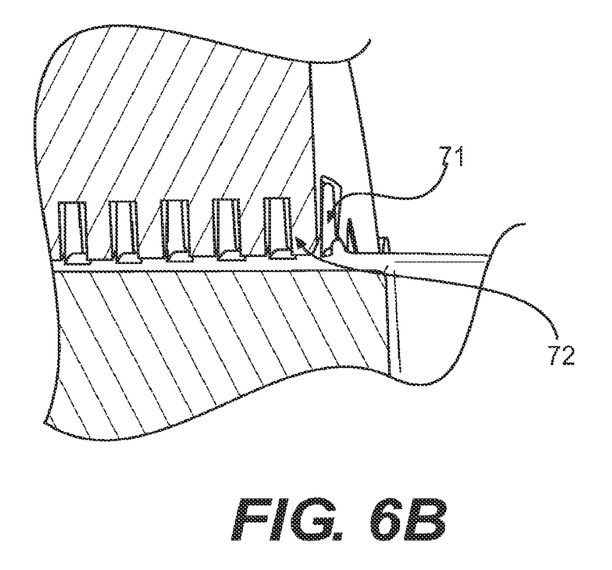
FIG. 6B is another view of the locked condition.

As seen in FIG. 5, the side gear 19 may also comprise a lip 62. The lip 62 may be sized to prevent the collar from moving past the side gear segments 71 toward the end cap 12. A clearance gap may be present between the lip 62 and the side gear segments 71 to allow collar segments 72 to freely rotate in the clearance gap.

Compared to prior direct acting coils, the disclosed locking differential has a low stroke length and a high locking engagement length. That is, prior differentials with direct acting coils have a low force and low travel length, which limits the total engagement length. The prior engagement length was equal to the coil travel minus the clearance.

$$\text{Prior Engagement Length} = (\text{coil travel} - \text{clearance}) \qquad \text{Eq. 1.}$$

By creating multiple engagement overlaps via the segments, the new locking mechanism total engagement length is not limited to the length of travel of the coil travel. Instead, the engagement length can be determined as the coil travel minus the clearance times the number of overlaps.

$$\text{New Engagement Length} = (\text{coil travel} - \text{clearance}) \times (\text{number of overlaps}) \qquad \text{Eq. 2.}$$

Referring again to FIG. 1, and in conjunction with FIG. 3, the gear case 11 defines a plurality of cylindrical openings 45. Slidably disposed within each opening 45 is an elongated, generally cylindrical actuation member 47. By way of example only, there are three of the actuation members 47. Each actuation member 47 has a first end 49 in engagement with the collar member 35, and a second end 51 extending somewhat out of the gear case 11. Each of the ends 51 may be configured to be somewhat hemi-spherical so that ends 51 may slide on ramp surfaces 55. The three actuation members 47 may engage at the ears 37 which are at the 2 o'clock, 6 o'clock, and 10 o'clock positions in FIG. 2.

Disposed about the gear case 11 at the end adjacent the side gear 21 is the actuator 33 which includes a single ramp plate 53 which defines a plurality of ramp surfaces 55 and intervening valleys. There is one ramp surface 55 with an apex and one valley for each actuation member 47. This is a "pin-and-ramp" style device, having one ramp plate and one set of "pins" (i.e., the actuation members 47) provided for an axial travel of the actuation members 47. The "inner" ramp plate is the member which has "travel."

Because of the spacing between segments, the "travel" is significantly decreased over the prior art. For example, the segments may be sized for a 1.5 mm stroke length. However, the engagement length is 6 mm. This is in contrast to the prior art where the stroke length was roughly equal to the engagement length.

The actuator 33 further includes an electromagnetic coil, generally designated 57. The function of the electromagnetic coil is to exert the required retarding torque on the ramp plate 53, thus initiating ramp-up of the actuation members 47. As used herein, the term "ramp-up" in regard to the actuation members 47 includes moving the members 47 from the fully retracted position shown in FIGS. 3 and 4, wherein the coil 57 is not energized (corresponding to the un-actuated, unlocked condition), to a fully extended position, wherein the coil 57 is energized (corresponding to the actuated, locked condition). The electromagnetic coil 57 may cause the ramp plate 53 to rotate so that the peaks of ramps push the actuation members (pins) towards the collar 35. The ears 37 of the collar slide in the corresponding recesses 39 of the gear case 11 so that the collar 35 moves towards the end cap 12 and away from the ramp plate 53 to the locked condition.

The collar member 35 is biased toward the un-actuated, unlocked condition by means of a wave spring 61, shown in FIGS. 3 and 4. A number of different biasing arrangements could be utilized, though the wave spring 61 facilitates a compact packaging of the rotation prevention mechanism 31. When the electromagnetic coil 57 is de-energized, the ramp plate 53 may rotate so that valleys of the ramp plate 53 align with the actuation members 47. The wave spring 61 then pushes the collar 35 away from the end cap 12 and towards the ramp plate 53 to unlock the differential. Thus, the collar 35 is able to move bi-directionally along an axis A-A in FIG. 1 based on whether the actuator 33 is ramped-up or not.

As shown somewhat schematically in FIG. 1, the electromagnetic coil 57 is energized by means of a pair of electrical leads 59, the reference numeral "59" also being used hereinafter to identify an electrical input signal to the actuator 33.

While the ramp and coil actuation has been illustrated, other actuation means, such as ball and ramp may be used. The actuation means used must be capable of moving the collar with respect to the side gear.

The locking differential may be controlled in either of a pair of modes. The differential may be controlled manually, i.e., wherein the driver manually selects the locked mode (rather than the unlocked mode). The differential may operate in the locked mode after the mode is manually selected. Alternately, the locking differential may be allowed to operate in an automatic mode wherein, by way of example only, the vehicle microprocessor senses an operational condition, such as an incipient wheel slip, and transmits an appropriate electrical signal to the locking differential, thereby locking the side gear 19 relative to the gear case 11, to prevent any further differentiation there between.

In the case of automatic actuation of the locking differential, under certain operation conditions, such as when the vehicle is turning, or a slight difference in tire size exists, it is permissible for a certain amount of differentiating action to occur between the side gears 19 and 21. However, the example of FIG. 1 does not include illustrations for a clutch pack or other mechanism which retards or limits differentiating action. The example instead operates like an "open differential" in either an un-actuated, unlocked mode or in an actuated, locked mode.

The differential may comprise sufficient inputs, such as the electrical leads 59, to enable manual or automatic operation. If necessary, the differential may comprise affiliations such as CAN, bus, computing (storage, processing, and programming), etc to effectuate the manual or automatic operation and may further comprise outputs and other hardware and software to send signals indicating locked or unlocked conditions.

FIG. 5 illustrates the travel "T" of the collar member 35, in moving between locked (FIGS. 6A and 6B) and unlocked (FIGS. 3, 4 and 5) conditions. The travel T is equal to the width of a segment plus a clearance. In this example, the travel is equal to about 1.5 mm. The stroke length, or distance an actuation member must move to engage the collar 35 with the side gear, is also about 1.5 mm in this example. Thus, instead of traveling the entirety of the engagement length to unlock or lock the differential, the travel is reduced significantly to a fraction of the engagement length.

The engagement length (i.e., the axial length of the engagement) between the lock members 41 and 43 is about 6 mm in this example. This is because 1 segment on a collar lock member 41 provides approximately 1 mm of width to engage with approximately 1 mm of width on a segment of a side gear lock member 43. Since there are 6 segments on each lock member, a lock member additively has approximately 6 mm of engagement length.

FIG. 6A illustrates one example of a locked condition. The collar 35 is aligned with the side gear 19 so that collar segments 72 no longer align with grooves in the side gear locking members 43. The side gear locking members 43 are in face-to-face engagement with the collar locking members 41, and segments 71 of the side gear locking members 43 are no longer in alignment with grooves in the collar locking members 41. As shown in FIG. 6B, the grooves in the side gear locking members 43 are aligned with the grooves in the collar locking members 41.

The number, width, length, and spacing of segments and locking members may vary from that illustrated, and the rotation direction of the side gear 19 may be clockwise (as illustrated) or counterclockwise. In addition, since the drawings are not to exact scale, the width of the collar and the expanse of the segments on the side gear 19 may vary. The placement of the segments on the side gear 19 may be leftward, as in FIG. 1, rightward, as in FIG. 3, or the segments may span from left to right or some intermediate length to that shown in FIGS. 1 and 3.

In the preceding specification, various descriptions have been made with reference to the accompanying drawings. It will, however, be evident that various other modifications and changes may be made thereto, and additional aspects may be implemented, without departing from the broader scope of the claims that follow. The specification and drawings are accordingly to be regarded in an illustrative rather than restrictive sense.

We claim:

1. A differential, comprising:
   a gear case comprising a central axis and recesses;
   a side gear configured to rotate around the central axis, the side gear comprising a plurality of radially outward-extending locking members separated by spaces, each of the radially outward-extending locking members further comprising plural side gear segments separated by corresponding grooves;
   an actuator surrounding at least a portion of the central axis; and
   a collar configured to translate bi-directionally along a portion of the central axis, the collar comprising outwardly-extending ears and a plurality of radially inward-extending locking members, each of the radially inward-extending locking members being separated by spaces and each radially inward-extending locking members further comprising plural collar segments separated by corresponding grooves, wherein:
the actuator is configured to move the collar relative to the side gear such that the ears move axially in the recesses,
when the actuator moves the collar to a locked position, the collar segments are configured to engage the side gear segments, and
when the actuator moves the collar to an unlocked position, the side gear segments are configured to pass through the grooves of the radially inward-extending locking members.

2. The differential of claim 1, wherein the gear case at least partially surrounds the collar, the side gear, and the actuator.

3. The differential of claim 2, wherein the gear case is configured such that a portion of the collar is embedded in the gear case and a portion of the actuator is embedded in the gear case, and the gear case further comprises an end cap for cooperation with the gear case, wherein a portion of the side gear is embedded in the end cap.

4. The differential of claim 1, wherein the actuator comprises a ramped plate and at least one actuation pin, and wherein the ramped plate is configured to selectively move the at least one actuation pin to move the collar.

5. The differential of claim 4, further comprising a wave spring and an end cap, wherein the wave spring presses against the collar and the end cap to bias the collar away from the end cap.

6. The differential of claim 1, wherein each radially outward-extending locking member comprises six side gear segments and each radially inward-extending locking member comprises six collar segments.

7. The differential of claim 1, wherein the side gear further comprises a lip adjacent to the plurality of radially outward-extending locking members.

8. The differential of claim 1, wherein each side gear segment is a polyhedron and each side gear segment is substantially identical to the other side gear segments, and wherein each collar segment is a polyhedron and each side gear segment is substantially identical to the other collar segments.

9. The differential of claim 1, wherein each side gear segment comprises a longest central axis that is substantially parallel to the longest central axis of each other side gear segment, and wherein each collar segment comprises a longest central axis that is substantially parallel to the longest central axis of each other side gear segment.

10. The differential of claim 1, wherein the side gear comprises nine radially outward-extending locking members and each radially outward-extending locking member comprises six side gear segments, and wherein the collar comprises nine radially inward-extending locking members and each radially inward-extending locking member comprises six collar segments.

11. The differential of claim 1, wherein each collar segment has a width, and wherein the collar must move only the distance of one collar segment width to go between the locked position and the unlocked position.

12. The differential of claim 1, wherein each side gear segment has a width, and wherein the collar must move only the distance of one side gear segment width to go between the locked position and the unlocked position.

13. The differential of claim 1, wherein each collar segment has a segment width, wherein each collar groove has a groove width, and wherein the width of each radially inward-extending locking member is the sum of its corresponding segment widths and its corresponding collar groove widths.

14. The differential of claim 13, wherein, to move between the locked position and the unlocked position, the collar must move a distance equal to one segment width or one groove width.

15. The differential of claim 1, wherein each side gear segment has a segment width, wherein each side gear groove has a groove width, and wherein the width of each radially outward-extending locking member is the sum of its corresponding segment widths and its corresponding collar groove widths.

16. The differential of claim 15, wherein, to move between the locked position and the unlocked position, the collar must move a distance equal to one segment width or one groove width.

* * * * *